(12) United States Patent
Nishikawa et al.

(10) Patent No.: US 10,541,402 B2
(45) Date of Patent: *Jan. 21, 2020

(54) ENERGY STORAGE APPARATUS (71) Applicant: GS Yuasa International Ltd., Kyoto-shi (JP)

(72) Inventors: Ryutaro Nishikawa, Kyoto (JP); Masamitsu Tononishi, Kyoto (JP); Osamu Ushijima, Kyoto (JP); Shogo Tsuruta, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 58 days.

This patent is subject to a terminal disclaimer.

(21) Appl. No.: 15/901,012

(22) Filed: Feb. 21, 2018

(65) Prior Publication Data

US 2018/0183031 A1    Jun. 28, 2018

Related U.S. Application Data

(63) Continuation of application No. 14/227,097, filed on Mar. 27, 2014, now Pat. No. 9,911,961.

(30) Foreign Application Priority Data

Mar. 29, 2013 (JP) ................................ 2013-073582

(51) Int. Cl.
| | | |
|---|---|---|
| *H01M 2/20* | (2006.01) | |
| *H01G 11/76* | (2013.01) | |
| *H01G 11/82* | (2013.01) | |

(52) U.S. Cl.
CPC ............ *H01M 2/202* (2013.01); *H01G 11/76* (2013.01); *H01G 11/82* (2013.01); *Y02E 60/13* (2013.01)

(58) Field of Classification Search
None
See application file for complete search history.

(56) References Cited

U.S. PATENT DOCUMENTS

| | | | | |
|---|---|---|---|---|
| RE36,102 E | * | 2/1999 | Dougherty | ............ H01M 2/24 429/160 |
| 9,911,961 B2 | * | 3/2018 | Nishikawa | ............ H01M 2/202 |

(Continued)

FOREIGN PATENT DOCUMENTS

| | | |
|---|---|---|
| JP | 2010-010460 A | 1/2010 |
| JP | 2010-056090 A | 3/2010 |

(Continued)

OTHER PUBLICATIONS

Office Action in U.S. Appl. No. 14/227,097 dated Jan. 27, 2016.

(Continued)

*Primary Examiner* — Scott J. Chmielecki (74) *Attorney, Agent, or Firm* — McGinn I. P. Law Group, PLLC (57) ABSTRACT

An energy storage apparatus includes an energy storage device including an electrode terminal, an outer housing containing the energy storage device, an outer electrode attached to an outside of the outer housing, an electrical device disposed inside the outer housing, a first electrical conductor connecting the outer electrode and the electrical device, and a second electrical conductor connecting the electrical device and the electrode terminal. In a plane along a surface of the energy storage device, the electrical device is disposed between the electrode terminal and the outer electrode.

14 Claims, 7 Drawing Sheets

(56) References Cited

U.S. PATENT DOCUMENTS

| | | | | |
|---|---|---|---|---|
| 2002/0098412 | A1* | 7/2002 | Rodriguez | H01M 2/0242 429/149 |
| 2005/0202315 | A1* | 9/2005 | Sugeno | H01M 2/0242 429/156 |
| 2006/0216577 | A1* | 9/2006 | Cheng | H01M 2/1072 429/49 |
| 2008/0063929 | A1* | 3/2008 | Byun | H01M 2/202 429/121 |
| 2008/0247133 | A1 | 10/2008 | Ito | |
| 2009/0253034 | A1* | 10/2009 | Nedelec | H01M 2/0285 429/181 |
| 2009/0311607 | A1* | 12/2009 | Han | H01M 2/04 429/246 |
| 2010/0015519 | A1* | 1/2010 | Trester | H01M 2/202 429/160 |
| 2010/0055560 | A1 | 3/2010 | Jang et al. | |
| 2010/0104932 | A1* | 4/2010 | Heidenbauer | H01M 2/1077 429/99 |
| 2010/0129703 | A1* | 5/2010 | Caumont | H01G 2/04 429/120 |
| 2010/0151312 | A1* | 6/2010 | Kim | H01M 2/202 429/158 |
| 2010/0196749 | A1* | 8/2010 | Yoshida | H01M 2/0242 429/99 |
| 2010/0266889 | A1* | 10/2010 | Kim | H01M 2/0257 429/158 |
| 2012/0058383 | A1* | 3/2012 | Hashizaki | H01M 2/202 429/158 |
| 2012/0070698 | A1 | 3/2012 | Baek | |
| 2012/0141847 | A1* | 6/2012 | Amagai | H01M 2/202 429/91 |
| 2012/0293016 | A1* | 11/2012 | Schaefer | H01M 2/202 307/117 |
| 2013/0034771 | A1* | 2/2013 | Delans | H01M 2/202 429/158 |
| 2013/0143102 | A1* | 6/2013 | Jiang | H01M 2/1072 429/159 |
| 2013/0171478 | A1 | 7/2013 | Ushijima | |
| 2013/0183573 | A1* | 7/2013 | Yoshioka | H01M 2/1077 429/159 |
| 2013/0269978 | A1* | 10/2013 | You | H01B 1/02 174/126.1 |
| 2013/0337306 | A1* | 12/2013 | Han | H01M 2/1016 429/99 |
| 2014/0017540 | A1* | 1/2014 | Miyawaki | H01M 2/1016 429/99 |
| 2014/0106202 | A1* | 4/2014 | Choi | H01M 2/202 429/159 |
| 2014/0147729 | A1* | 5/2014 | Moon | H01M 2/202 429/158 |
| 2014/0193680 | A1* | 7/2014 | Lee | H01M 10/482 429/82 |
| 2014/0272520 | A1* | 9/2014 | Kim | H01M 2/202 429/121 |
| 2014/0308557 | A1* | 10/2014 | Ebisawa | H01R 13/6315 429/99 |
| 2014/0308568 | A1* | 10/2014 | Kim | H01M 2/30 429/158 |
| 2015/0064541 | A1* | 3/2015 | Noh | H01M 2/1061 429/156 |
| 2015/0280336 | A1* | 10/2015 | Itou | H01M 2/30 439/625 |
| 2015/0303431 | A1* | 10/2015 | Tiefenbach | H01M 2/0285 429/158 |
| 2015/0357732 | A1* | 12/2015 | Casses | H01R 11/288 439/754 |

FOREIGN PATENT DOCUMENTS

| | | |
|---|---|---|
| JP | 2012-059663 A | 3/2012 |
| JP | 2012-181977 A | 9/2012 |
| JP | 2013-152923 A | 8/2013 |
| JP | 2013-168356 A | 8/2013 |
| JP | 2014-160570 A | 9/2014 |

OTHER PUBLICATIONS

Office Action in U.S. Appl. No. 14/227,097 dated Jul. 18, 2016.
Office Action in U.S. Appl. No. 14/227,097 dated Nov. 30, 2016.
Office Action in U.S. Appl. No. 14/227,097 dated May 24, 2017.
Notice of Allowancce in U.S. Appl. No. 14/227,097 dated Oct. 24, 2017.

* cited by examiner

ENERGY STORAGE APPARATUS

The present Application of U.S. patent application Ser. No. 14/227,097, filed on Mar. 27, 2014, which is based on and claims priority from Japanese Patent Application No. 2013-073582 filed on Mar. 29, 2013, the entire contents of which are incorporated herein by reference.

FIELD

The present invention relates to energy storage apparatuses including an outer housing that contains an energy storage device and an electrical device.

BACKGROUND

Energy storage apparatuses that include an energy storage device capable of charging and discharging that and are attached with an electrical device, such as an electronic substrate that monitors a charging and/or discharging state or a relay that interrupts the supply of power, are known.

For example, Patent Literature 1 (Japanese Unexamined Patent Application Publication No. 2012-59663) discloses an energy storage apparatus in which an electrical device for control purposes (battery monitoring unit) is disposed above a battery module configured of a plurality of battery cells.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides an energy storage apparatus having a minimized overall volume.

The energy storage apparatus according to one aspect of the present invention includes: an energy storage device including an electrode terminal; an outer housing containing the energy storage device; a first outer electrode attached to an outside of the outer housing; an electrical device disposed inside the outer housing; a first electrical conductor electrically connecting the first outer electrode and the electrical device; and a second electrical conductor electrically connecting the electrical device and the electrode terminal, wherein the electrode terminal and the first outer electrode are disposed on opposite sides of the electrical device in a plane along a surface of the energy storage device.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

Sometimes an electrical device which monitors charging and/or discharging or an electrical device which interrupts the supply of power is connected to an electrical conductor that electrically connects an energy storage device and an external device. In this case, the overall volume of the energy storage apparatus including the energy storage device and the electrical device tends to be large. In particular, when the energy storage device, the electrical device, and the electrical conductor are housed in a single package, it may be necessary to enlarge the energy storage apparatus depending on the arrangement of the electrical conductor and the electrical device.

One aspect of the present invention provides an energy storage apparatus that includes an energy storage device and an electrical device and has a minimized overall volume.

The energy storage apparatus according to one aspect of the present invention includes: an energy storage device including an electrode terminal; an outer housing containing the energy storage device; a first outer electrode attached to an outside of the outer housing; an electrical device disposed inside the outer housing; a first electrical conductor electrically connecting the first outer electrode and the electrical device; and a second electrical conductor electrically connecting the electrical device and the electrode terminal, wherein the electrode terminal and the first outer electrode are disposed on opposite sides of the electrical device in a plane along a surface of the energy storage device.

With this configuration, the electrical device is disposed between the electrode terminal and the first outer electrode in a plane along a surface of the energy storage device. This makes it possible to simplify the arrangement of the first electrical conductor and the second electrical conductor while keeping a portion of the first electrical conductor from being present between the electrical device and the outer housing. Space can therefore be efficiently used and the first electrical conductor can be kept from being unnecessarily long. The outer housing can be made to be compact as well.

The second electrical conductor may include: a connecting portion holding the first electrical conductor or the electrical device; and a vertical wall portion extending perpendicular to the connecting portion.

With this configuration, when the first electrical conductor and the second electrical conductor are connected, it is possible to prevent the second electrical conductor from deforming since force applied to the second electrical conductor in a vertical direction is received by the second electrical conductor vertical wall portion.

The energy storage device may include an other electrode terminal, the energy storage apparatus may further include: a second outer electrode attached to the outside of the outer housing and disposed away from the other electrode terminal in a direction along the surface of the energy storage device; an other electrical device disposed inside the outer housing between the other electrode terminal and the second outer electrode; a third electrical conductor electrically connecting the second outer electrode and the other electrical device; and a fourth electrical conductor electrically connecting the other electrical device and the other electrode terminal, and a distance between the first outer electrode and the second outer electrode may be greater than a distance between the electrode terminal to which the second electrical conductor is connected and the other electrode terminal to which the fourth electrical conductor is connected.

With this configuration, it is possible to increase the space between the first outer electrode (second outer electrode) and the electrode terminal to which the second electrical conductor (fourth electrical conductor) is not directly connected, and thereby prevent discharging between the first outer electrode (second outer electrode) and the electrode terminal. With this configuration it is moreover possible to widen the space between the first electrical conductor and the second electrical conductor in which the electrical device is disposed, making it possible to achieve a compact outer housing even when a large electrical device is attached to the first electrical conductor and/or the second electrical conductor.

The outer housing may further include a lid including a bulging portion bulging outward, and the bulging portion may contain the electrical device therein.

With this configuration, it is possible to attach the lid to the outer housing main body while the electrical device is contained in the bulging portion and keep the electrical device from being unintentionally dropped on the energy storage device. This makes it possible to improve work performance in regard to assembling the energy storage apparatus. Moreover, making only locations corresponding to the electrical device bulge out makes it possible to minimize the overall volume occupied by the outer housing.

The first outer electrode may be disposed to a side of the bulging portion and may protrude not beyond the bulging portion.

With this configuration, it is possible to reduce the length of the first electrical conductor.

The bulging portion may be provided with a cavity recessed from the outside, and a connector connected to the electrical device may be provided in the cavity.

With this configuration, the connector connecting an external device and the electrical device of the energy storage apparatus is disposed embedded in the bulging portion. This mechanically protects the connector with the bulging portion and makes it possible to prevent the connector from absorbing the energy from an impact when some component is dropped on the energy storage apparatus, for example. This makes it possible to protect the connector.

A removable cover may be attached to the bulging portion, and removing the cover may expose the bulging portion.

With this configuration, it is possible to connect the first electrical conductor and the second electrical conductor after the lid is attached to the outer housing, which simplifies the assembly of the energy storage apparatus. This also makes it possible to assemble the outer housing after the electrical device and such are attached in the bulging portion, and then run the wiring. As such, it is possible to keep parts from being dropped on the energy storage device during assembly of the energy storage apparatus.

The energy storage device may include a plurality of battery cells, and the battery cells may be arranged such that the electrode terminal having a positive polarity of a first of an adjacent pair of the battery cells is next to the electrode terminal having a negative polarity of a second of the adjacent pair of the battery cells, and the electrode terminal having the positive polarity and the electrode terminal having the negative polarity that are next to each other may be connected to each other to electrically connect the battery cells in series.

With this configuration, it is possible to achieve a large capacity energy storage apparatus that is small in volume.

Hereinafter, an embodiment of the energy storage apparatus according to the present invention is described with reference to the Drawings. It should be noted that the following embodiment is merely one example of the energy storage apparatus according to the present invention. Accordingly, the scope of the present invention is demarcated by the scope of the language in the claims using the below embodiment as a reference, and is not intended to be limited merely by the following embodiment. Therefore, among the structural elements in the following exemplary embodiment, structural elements not recited in any one of the independent claims defining the most generic part of the inventive concept are described as preferred structural elements, and are not absolutely necessary to overcome the problem according to the present invention.

Figure 1:
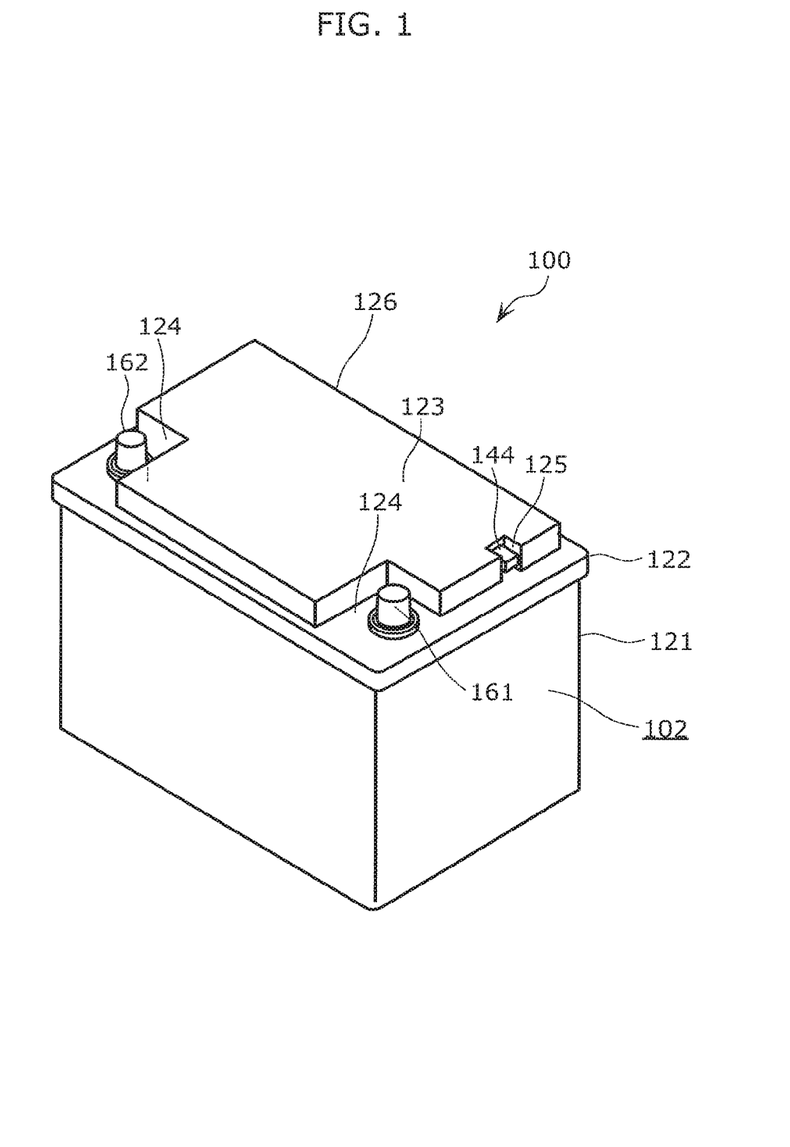
FIG. 1 is a perspective view of the energy storage apparatus.

FIG. 1 is a perspective view of the energy storage apparatus.

Figure 2:
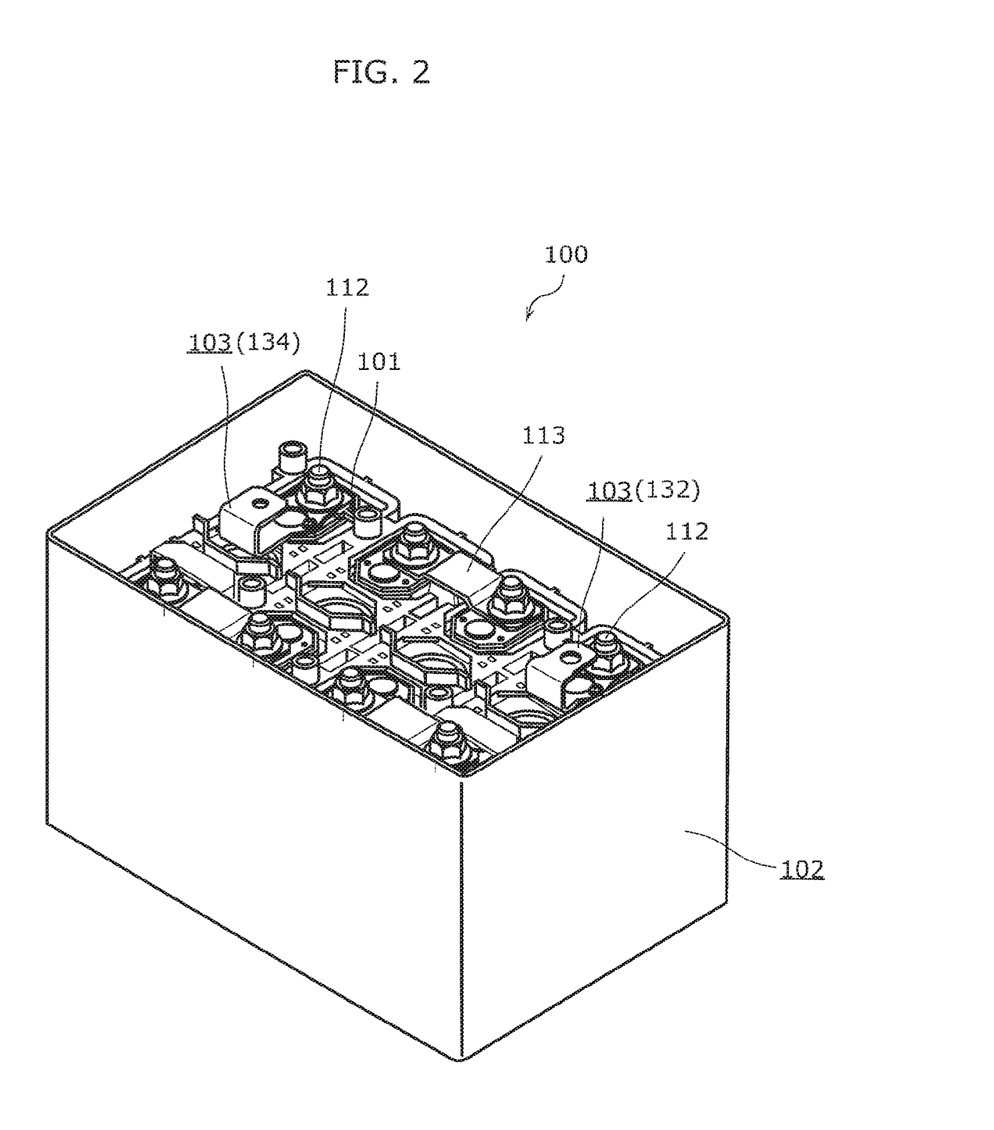
FIG. 2 is a perspective view of the energy storage apparatus with the lid removed.

FIG. 2 is a perspective view of the energy storage apparatus with the lid removed.

Figure 3:
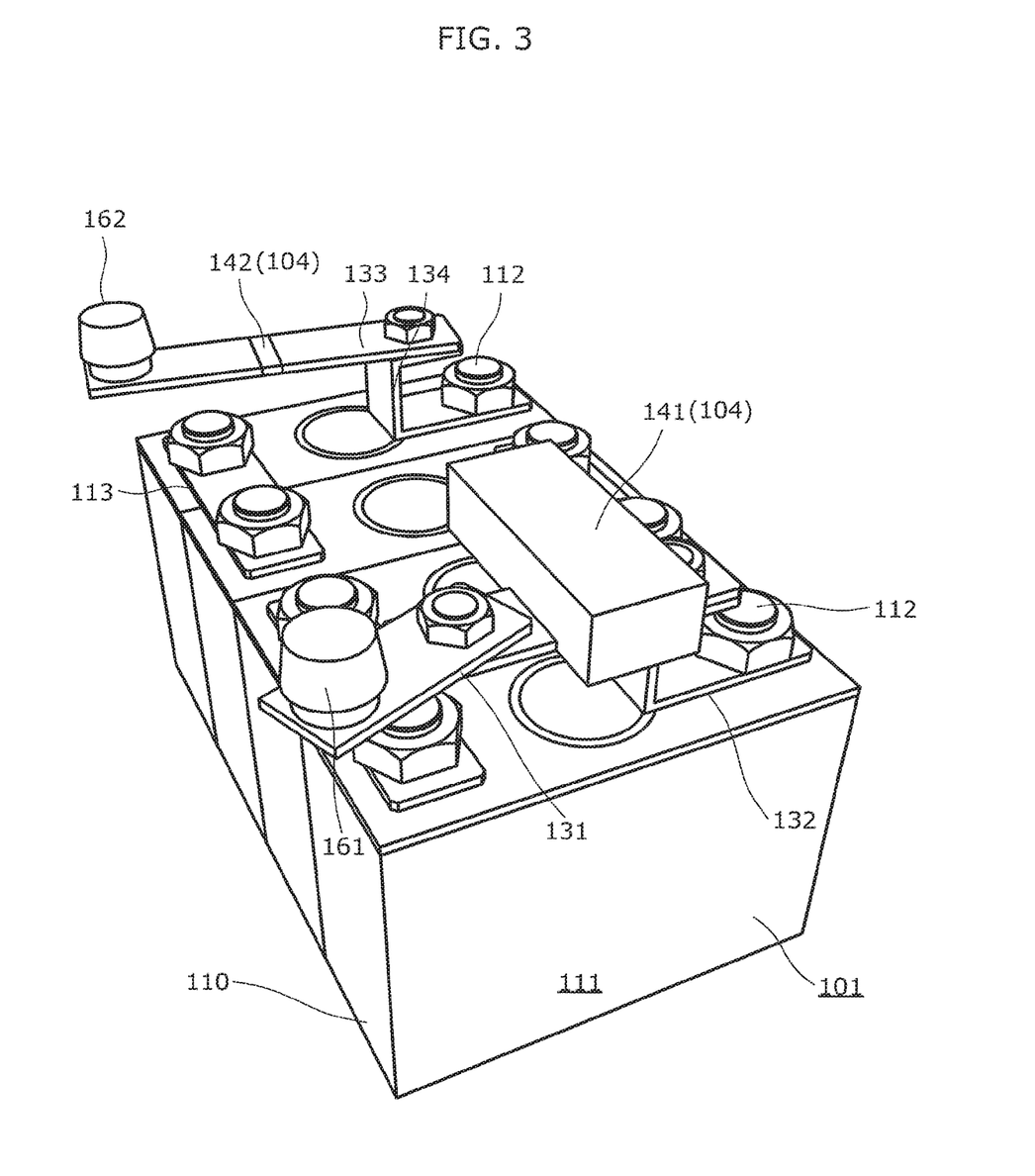
FIG. 3 is a perspective view of the energy storage apparatus with the outer housing omitted.

FIG. 3 is a perspective view of the energy storage apparatus with the outer housing omitted.

As is illustrated in these Drawings, an energy storage apparatus 100 includes a battery 101, an outer housing 102, a first electrical conductor 131, a second electrical conductor 132, an electrical device 104, and a first outer electrode 161. The energy storage apparatus 100 is a portable battery module that is capable of monitoring its own charging and/or discharging state. The energy storage apparatus 100 further includes a third electrical conductor 133, a fourth electrical conductor 134, and a second outer electrode 162.

The battery 101 is an energy storage device that is capable of charging and capable of discharging. The battery 101 includes a case 111, a plurality of electrode terminals 112, and a safety valve 114.

The case 111 is a component that contains, for example, an electrode assembly and an electrolyte in a hermetically sealed state. The case 111 is a component which provides structural strength for the battery 101. The battery 101 includes a plurality of battery cells 110 which each function as a stand alone battery.

The electrode terminal 112 is a component disposed on a surface of the case 111. The electrode terminal 112 is a component that conducts electricity between the inside and the outside of the case 111. The battery cell 110 includes two electrode terminals 112 corresponding to respective positive and negative electrodes and protruding in the same direction. The battery 101 includes two times as many electrode terminals 112 as battery cells 110.

The cases of the battery cells 110 are arranged such that the long walls thereof face each other. The battery cells 110 are arranged such that the positive electrode terminal 112 of a first of an adjacent pair of the battery cells 110 is next to the negative electrode terminal 112 of a second of the adjacent pair of the battery cells 110. Moreover, the battery cells 110 are electrically connected in series as a result of the adjacent ones of the negative electrode terminal 112 and the positive electrode terminal 112 being connected with a bus bar 113. A plurality of these battery cells 110 connected in series constitute the battery 101.

The outer housing 102 is a box-shaped component that contains the battery 101, the first electrical conductor 131, the second electrical conductor 132, and the electrical device 104. The outer housing 102 includes an outer housing main body 121 and a lid 122. The battery 101 is disposed in a predetermined position in the outer housing main body 121. The outer housing 102 functions to protect the battery 101 from impact and keep the battery 101 from unintentionally contacting metal components and such. The outer housing 102 is made from an insulating material such as resin.

The first electrical conductor 131 is a component that electrically connects the first outer electrode 161 and the electrical device 104. The first electrical conductor 131 is a rigid, electrically conductive component (bus bar) that extends from the vicinity of one (for example, the negative) electrode terminal 112 toward another (for example, the positive) electrode terminal 112. One end of the first electrical conductor 131 is electrically connected to the positive electrode terminal 112 through the second electrical conductor 132. The other end of the first electrical conductor 131 is electrically connected to the first outer electrode 161. A relay 141, which is one example of the electrical device 104, is connected to the first electrical conductor 131.

It should be noted that the first electrical conductor 131 may be pliable. More specifically, the first electrical conductor 131 may be a flexible flat cable.

The energy storage apparatus 100 also includes the third electrical conductor 133. The third electrical conductor 133 is a component that electrically connects the second outer electrode 162 and the electrical device 104. The third electrical conductor 133 is a rigid, electrically conductive component (bus bar) that extends from the vicinity of one (for example, the positive) electrode terminal 112 toward another (for example, the negative) electrode terminal 112. One end of the third electrical conductor 133 is electrically connected to the negative electrode terminal 112 through the fourth electrical conductor 134 (to be described later). The other end of the third electrical conductor 133 is electrically connected to the second outer electrode 162. A shunt resistor 142, which is one example of the electrical device 104, is connected to the third electrical conductor 133.

It should be noted that in FIG. 3, the second electrical conductor 132 and the fourth electrical conductor 134 are illustrated as being above part of the safety valve 114, but the configuration is not limited the illustration in FIG. 3. For example, the second electrical conductor 132 and the fourth electrical conductor 134 may be arranged such that they do not positionally overlap with the safety valve 114, and a guide for guiding gas that emits from the safety valve out of the outer housing 102 may be provided above the safety valve 114.

Figure 4:
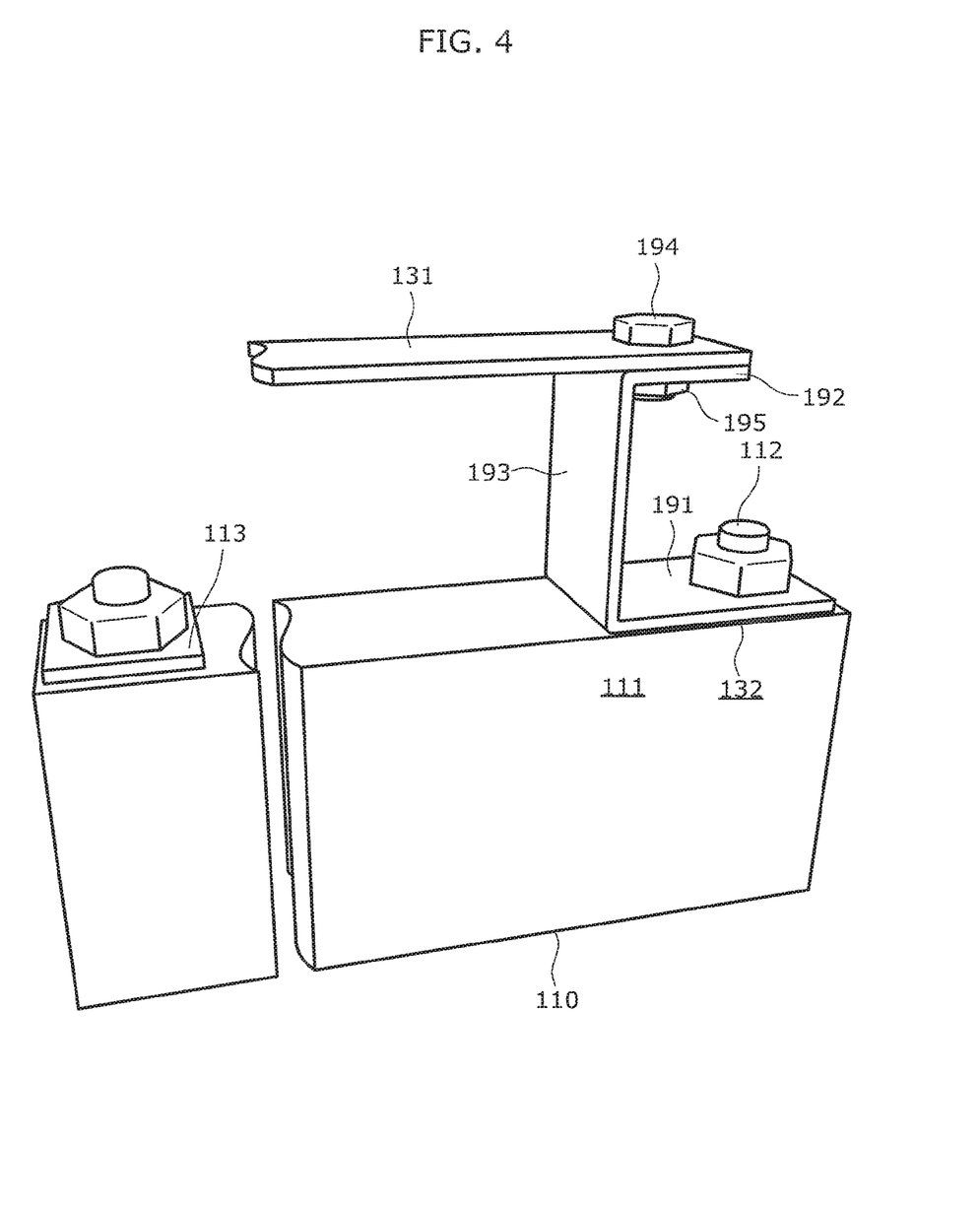
FIG. 4 is a schematic view of a battery cell to which the first electrical conductor and the second electrical conductor are connected.

FIG. 4 is a perspective view schematically illustrating a battery cell to which the first electrical conductor and the second electrical conductor are connected.

The second electrical conductor 132 is a component that electrically connects the electrical device 104 and the electrode terminal 112. In this embodiment, the second electrical conductor 132 is a component that electrically connects the positive electrode terminal 112 and the first electrical conductor 131. The second electrical conductor 132 is an electrically conductive component that mechanically holds the first electrical conductor 131 in a position away from the case 111. The second electrical conductor 132 is formed by bending, in the thickness direction, a rigid plate-shaped bus bar having conductive properties. More specifically, the second electrical conductor 132 includes an extending portion 191 that extends from the positive electrode terminal 112 in a direction along the case 111, a vertical wall portion 193 extending from an end of the extending portion 191 in a direction away from the case 111, and a connecting portion 192 extending from an end of the vertical wall portion 193, parallel or substantially parallel to the extending portion 191, and toward the positive electrode terminal 112. The second electrical conductor 132 has a C-shape when viewed from the side. This shape increases the strength of the second electrical conductor 132. The manner in which the second electrical conductor 132 is bent can be changed accordingly to suit variations in the distance between the electrical device 104 and the electrode terminal 112.

The second electrical conductor 132 (the fourth electrical conductor 134) has been described as a rigid component having a C-shape when viewed from the side, but the second electrical conductor 132 is not limited to this example. It is preferable that an insulating component be provided between the second electrical conductor 132 and the case 111 to prevent the case 111 and the second electrical conductor 132 from shorting.

A rigid component is a component that is rigid enough to support its own weight or more.

The first electrical conductor 131 and the second electrical conductor 132 are electrically and mechanically connected in a detachable manner. More specifically, an end of the first electrical conductor 131 is provided with a hole extending therethrough in the thickness direction. A bolt 194 can be inserted through the hole. The connecting portion 192 of the second electrical conductor 132 is provided with a hole extending therethrough in the thickness direction. A nut 195 is fixed to the hole. The bolt 194 passing through the first electrical conductor 131 engages with the nut fixed to the second electrical conductor 132 so as to fasten the first electrical conductor 131 and the second electrical conductor 132 together and electrically and mechanically connect the first electrical conductor 131 and the second electrical conductor 132.

The energy storage apparatus 100 includes the fourth electrical conductor 134. The fourth electrical conductor 134 is a component that electrically connects the negative electrode terminal 112 and the third electrical conductor 133. The fourth electrical conductor 134 is an electrically conductive component that mechanically holds the third electrical conductor 133 in a position away from the case 111. The fourth electrical conductor 134 is formed by bending, in the thickness direction, a rigid plate-shaped bus bar having conductive properties. More specifically, the fourth electrical conductor 134 has the same shape and structure as the second electrical conductor 132.

The third electrical conductor 133 and the fourth electrical conductor 134 are electrically and mechanically connected in a detachable manner. Specifics regarding the attachment configuration of the third electrical conductor 133 and the fourth electrical conductor 134 are the same as the attachment configuration of the first electrical conductor 131 and the second electrical conductor 132.

The first outer electrode 161 is attached to the outside of the outer housing 102 and is an electrode disposed away from the electrode terminal 112 in a direction along a surface of the battery 101. The first outer electrode 161 is a conductive component electrically connected to the first electrical conductor 131 and arranged protruding through the outer housing 102. The first outer electrode 161 is electrically connected to an external device in order to charge the battery 101 or supply power from the battery 101. The first outer electrode 161 is mechanically connected to an end of the first electrical conductor 131 and mechanically connected to the lid 122.

The second outer electrode 162 is attached to the outside of the outer housing 102 and is an electrode disposed away from a different electrode terminal 112 in a direction along a surface of the battery 101. The second outer electrode 162 is a conductive component electrically connected to the third electrical conductor 133 and arranged protruding through the outer housing 102. The second outer electrode 162 is electrically connected to an external device in order to charge the battery 101 or supply power from the battery 101. The second outer electrode 162 is mechanically connected to an end of the third electrical conductor 133 and mechanically connected to the lid 122.

As is illustrated in FIG. 3, the first outer electrode 161 and the second outer electrode 162 are arranged such that the distance between the first outer electrode 161 and the second outer electrode 162 is greater than the distance between the electrode terminal 112 to which the first electrical conductor 131 is connected and the electrode terminal 112 to which the third electrical conductor 133 is connected. In other words, one of the first electrical conductor 131 or the second electrical conductor 132 is arranged to be oblique, not parallel, to the other of the first electrical conductor 131 or the second electrical conductor 132.

With this sort of arrangement, it is possible to increase the space between the first outer electrode 161 (the second outer electrode 162) and the electrode terminal 112 of a battery cell 110 connected to the electrode terminal of a different battery cell by a bus bar. This also makes it easier to dispose an insulating component. Additionally, the space between the first electrical conductor 131 and the second electrical conductor 132 can be widened, allowing for the electrical device 104 to easily be disposed between the first electrical conductor 131 and the second electrical conductor 132.

The electrical device 104 is a device that is connected to the first electrical conductor 131. The electrical device 104 is, for example, an electronic, electrical device capable of obtaining, monitoring, and/or controlling the state of the battery 101. More specifically, examples of the electrical device 104 include the relay 141 that interrupts the charging of electricity to the battery 101 and the discharging of electricity from the battery 101, a fuse (current interrupting component), the shunt resistor 142 for monitoring the charging and/or discharging state with current (voltage), and a control substrate 143 provided with a control circuit that monitors the voltage between terminals of the shunt resistor 142, controls the on/off state of the relay 141, and communicates with other devices.

The electrical device 104 is disposed between the electrode terminal 112 and the first outer electrode 161 (or the second outer electrode 162) in a plane along the surface of the battery 101 (in other words, in a plan view of the battery 101). With this, it is possible to eliminate wasteful space in a direction intersecting the surface of the battery 101, and provide a compact energy storage apparatus 100.

The plane along the surface of the battery 101 is a plane parallel to any surface appearing on the outer surface of the case 111 of the battery 101, and in the case of the embodiment, is a plane parallel to the surface of the case 111 of the battery 101 to which the electrode terminal 112 is attached.

In the embodiment, the electrical device 104 is held away (held mid-air) from the case 111 of the battery 101. With this, even if the case 111 expands, the electrical device 104 is unaffected. In particular, the case 111 easily expands if the plurality of battery cells 110 are not restrained with an end plate. In this case, it is preferable that the present structure which separates the electrical device 104 from the case 111 be used. Additionally, if a substance is emitted from, for example, the safety valve 114, since the electrical device 104 is disposed away from the safety valve, the electrical device is not damaged from the substance, and emission by the safety valve 114 can be carried out smoothly. This in turn makes it easier to place a guide for guiding the substance, such as gas, out of the outer housing 102.

In the embodiment, the electrical device 104, the first electrical conductor 131, and the third electrical conductor 133 are attached to the lid 122 that is attachable and detachable to the outer housing main body 121. The lid 122 further includes a bulging portion 123 that bulges outward. The bulging portion 123 is the part of the lid 122 that contains the electrical device 104 therein. The first outer electrode 161 and the second outer electrode 162 mechanically attached to the lid 122 are disposed to the sides of the bulging portion and do not protrude beyond the bulging portion 123. The first outer electrode 161 and the second outer electrode 162 are arranged in the cutout portions 124 of the bulging portion 123, and are surrounded by the bulging portion 123 on two sides. The bulging portion 123 protects the first outer electrode 161 and the second outer electrode 162 from physical impact.

The bulging portion 123 is also provided with a cavity 125 recessed from the outside, and a connector 144 connected to the electrical device 104 is provided in the cavity 125. The cavity 125 is provided on the side wall of the bulging portion 123. The bulging portion 123 protects the connector 144 from physical impact.

A removable cover 126 is attached to the bulging portion 123, and removing the cover 126 exposes the bulging portion 123.

Figure 5:
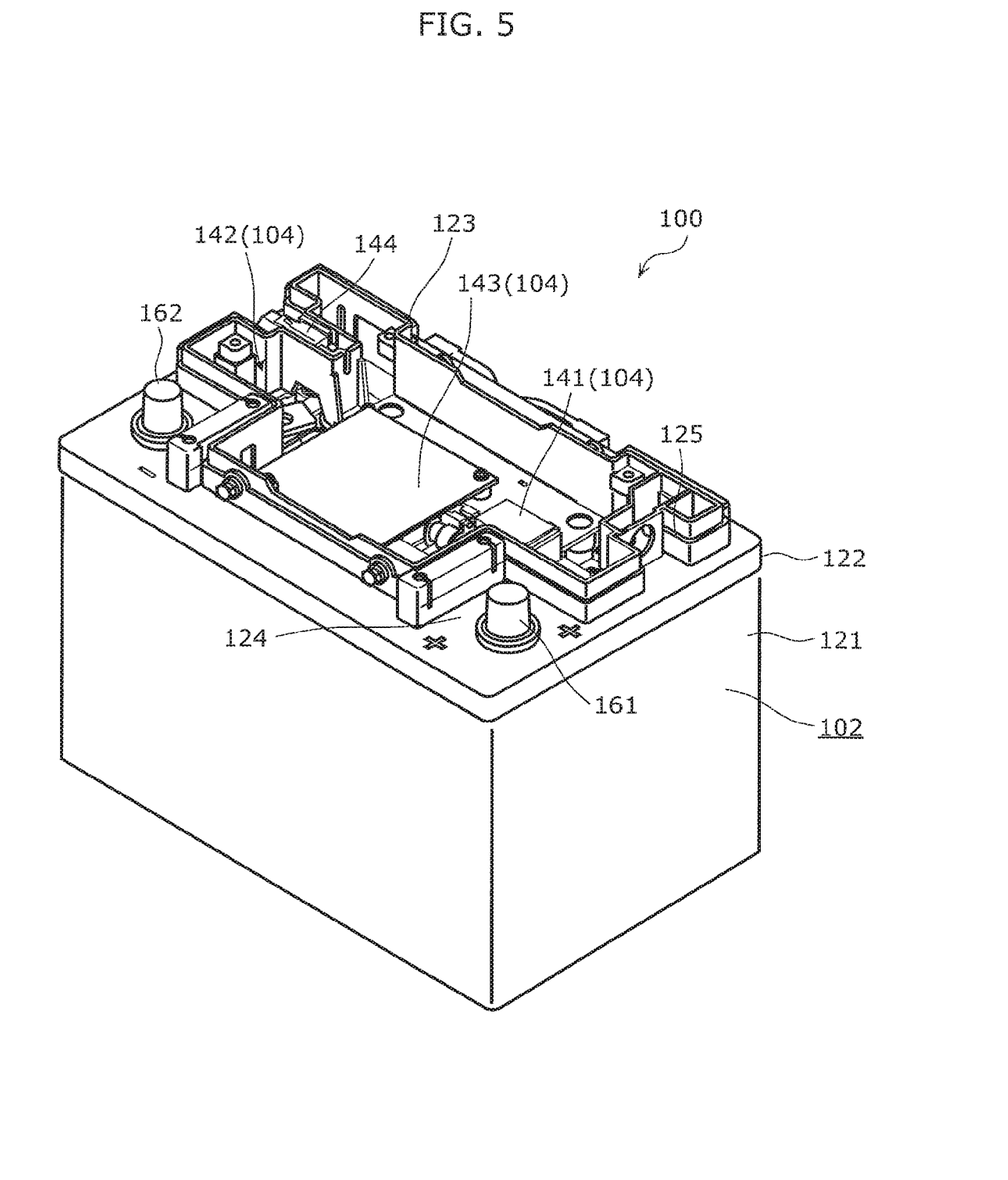
FIG. 5 is a perspective view with the cover removed.

FIG. 5 is a perspective view with the cover 126 removed.

Removing the cover 126 attached to the bulging portion 123 allows for easy access to the relay 141, the shunt resistor 142, and the control substrate 143, and makes adjustment work on, for example, the control substrate 143 easy. This also makes it possible to expose the connecting portion of the first electrical conductor 131 and the second electrical conductor 132 as well as the connecting portion of the third electrical conductor 133 and the fourth electrical conductor 134. As such, once the first electrical conductor 131, the third electrical conductor 133, and the electrical device 104 are attached to the lid 122, it is possible to attach the lid 122 to the outer housing main body 121 and join the first electrical conductor 131 to the second electrical conductor 132 and join the third electrical conductor 133 to the fourth electrical conductor 134 by attaching bolts, for example, to the exposed connecting portions.

As such, it is possible to keep items from falling or coming into contact with the battery 101 (in particular the safety valve 114 area) during assembly of the energy storage apparatus 100 and increase the yield rate.

It is to be noted that the present invention is not limited to the above exemplary embodiment. For example, those skilled in the art will readily appreciate that many modifications are possible in the exemplary embodiment without materially departing from the novel teachings and advantages of the present invention. Accordingly, all such modifications are intended to be included within the scope of the present invention.

Figure 6:
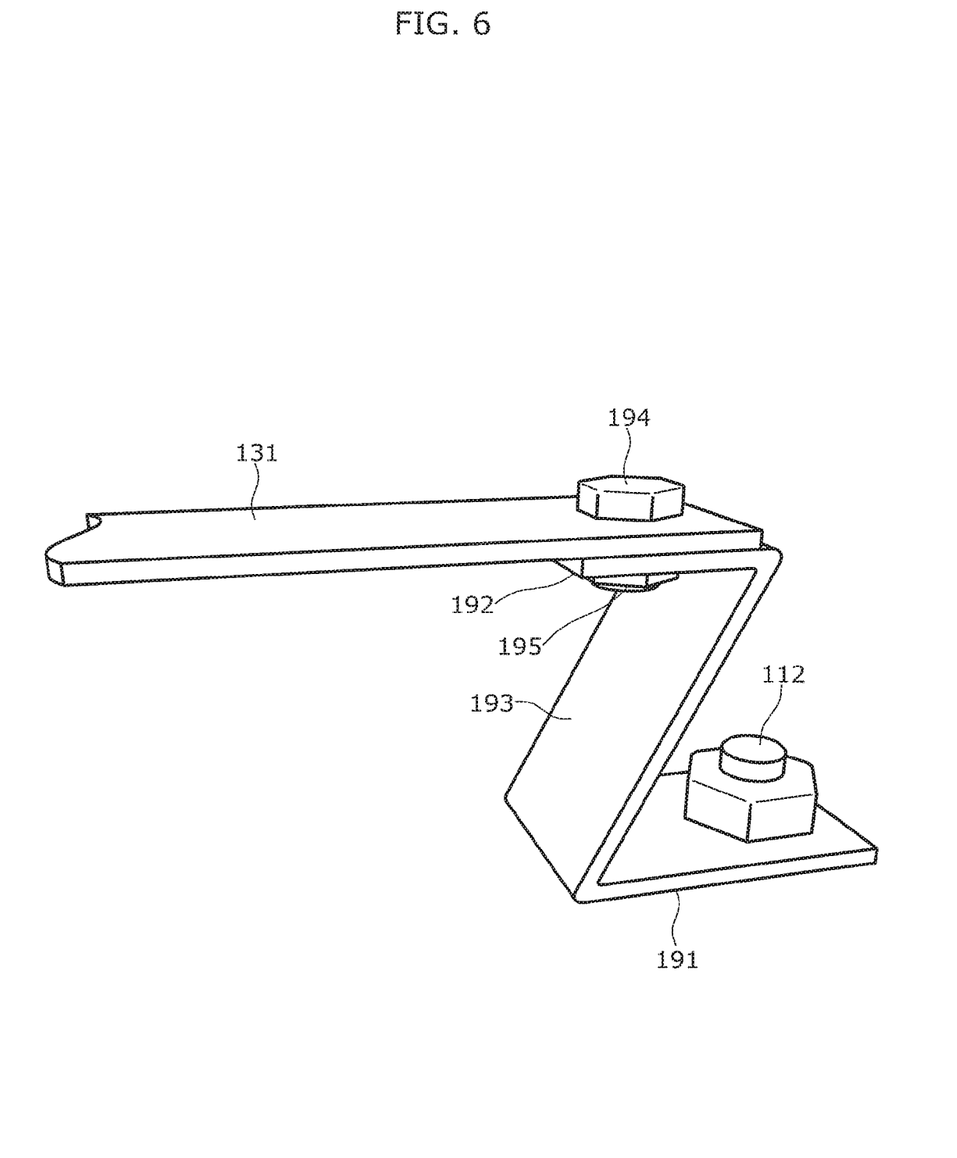
FIG. 6 is a perspective view of another configuration of the second electrical conductor (the fourth electrical conductor).
Figure 7:
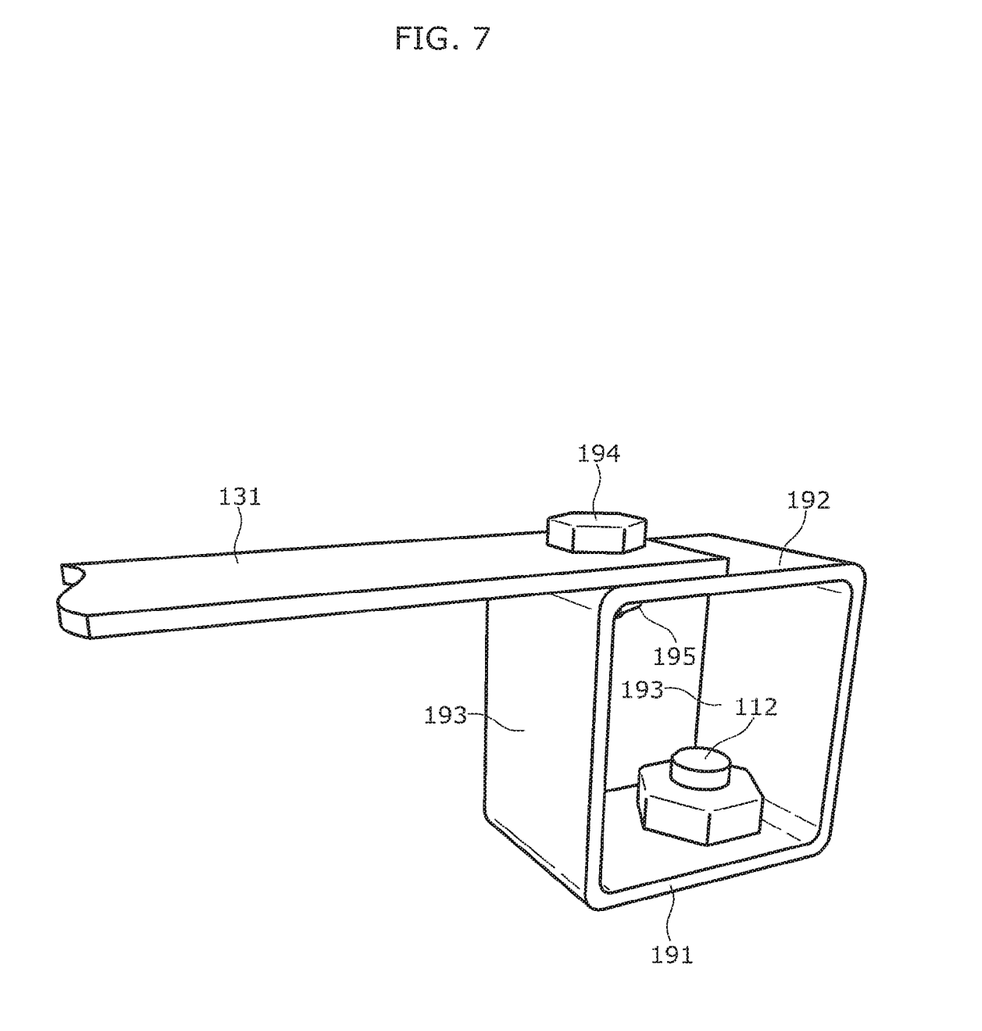
FIG. 7 is a perspective view of another configuration of the second electrical conductor (the fourth electrical conductor).

For example, the second electrical conductor 132 and the fourth electrical conductor 134 are not limited to the shape illustrated in FIG. 4. The second electrical conductor 132 and the fourth electrical conductor 134 may have a Z shape when viewed from the side, like is illustrated in FIG. 6, or have a closed square shape, like is illustrated in FIG. 7. The second electrical conductor 132 (fourth electrical conductor 134) having the closed square shape illustrated in FIG. 7 is structurally strong and capable of securely holding the first electrical conductor 131 (third electrical conductor 133) in a given position, but working with this configuration, such as attaching bolts, is difficult, and the weight of the piece tends to increase. In contrast, with the second electrical conductor 132 (fourth electrical conductor 134) having the C-shape in the side view such as is illustrated in FIG. 4, since one side is open, the structural strength is weaker in comparison, but the second electrical conductor 132 (fourth electrical conductor 134) still has sufficient strength to hold the first electrical conductor 131 (third electrical conductor 133) in a given position. Additionally, working with this configuration, such as attaching bolts, is easier, and the weight of the piece can be reduced.

The present invention is not limited to a battery, and may use a capacitor as the energy storage device.

The electrical device 104 and the first outer electrode 161 (second outer electrode 162) may be arranged in the stacking direction of the battery 101 relative to the electrode terminal 112 of the battery 101.

The invention claimed is:

1. An energy storage apparatus, comprising:
an energy storage device including an electrode terminal;
an outer housing containing the energy storage device;
an outer electrode attached to an outside of the outer housing;
an electrical device disposed inside the outer housing;
a first electrical conductor connecting the outer electrode and the electrical device; and
a second electrical conductor connecting the electrical device and the electrode terminal,
wherein, in a plane along a surface of the energy storage device, the electrical device is disposed between the electrode terminal and the outer electrode.

2. The energy storage apparatus according to claim 1, wherein the first electrical conductor electrically connects the outer electrode and the electrical device, and
wherein the second electrical conductor electrically connects the electrical device and the electrode terminal.

3. The energy storage apparatus according to claim 1, wherein, in the plane along the surface of the energy storage device, the electrode terminal and the outer electrode are disposed on opposite sides of the electrical device.

4. The energy storage apparatus according to claim 1, wherein, in the plane along the surface of the energy storage device, the electrode terminal and the outer electrode are disposed on different sides of the electrical device.

5. The energy storage apparatus according to claim 1, wherein, in the plane along the surface of the energy storage device, the electrode terminal is disposed on a first side of the electrical device and the outer electrode is disposed on a second side of the electrical device.

6. The energy storage apparatus according to claim 1, wherein the energy storage apparatus includes a short side and a long side that is longer than the short side, and
wherein, in a side view from the short side of the energy storage apparatus, the electrode terminal and the outer electrode protrude from the surface of the energy storage device on different sides of the electrical device.

7. An energy storage apparatus, comprising:
an energy storage device including an electrode terminal;
an outer housing containing the energy storage device;
an outer electrode attached to an outside of the outer housing; and
an electrical device disposed inside the outer housing,
wherein, in a plane along a surface of the energy storage device, the electrical device is disposed between the electrode terminal and the outer electrode.

8. An energy storage apparatus, comprising:
an energy storage device including an electrode terminal;
an outer housing containing the energy storage device;
an outer electrode attached to an outside of the outer housing; and
an electrical device disposed inside the outer housing,
wherein the outer electrode is connected to the electrical device,
wherein the electrical device is connected to the electrode terminal, and
wherein, in a plane along a surface of the energy storage device, the electrical device is disposed between the electrode terminal and the outer electrode.

9. The energy storage apparatus according to claim 8, wherein the outer electrode is electrically connected to the electrical device, and
wherein the electrical device is electrically connected to the electrode terminal.

10. The energy storage apparatus according to claim 8, wherein, in the plane along the surface of the energy storage device, the electrode terminal and the outer electrode are disposed on opposite sides of the electrical device.

11. The energy storage apparatus according to claim 8, wherein, in the plane along the surface of the energy storage device, the electrode terminal and the outer electrode are disposed on different sides of the electrical device.

12. The energy storage apparatus according to claim 8, wherein, in the plane along the surface of the energy storage device, the electrode terminal is disposed on a first side of the electrical device and the outer electrode is disposed on a second side of the electrical device.

13. The energy storage apparatus according to claim 8, wherein, the energy storage apparatus includes a short side and a long side that is longer than the short side, and
wherein, in a side view through the short side of the energy storage apparatus, the electrode terminal and the outer electrode protrude from the surface of the energy storage device in different sides of the electrical device.

14. The energy storage apparatus according to claim 8, wherein the energy storage apparatus includes a short side and a long side that is longer than the short side, and
wherein, in a side view from the short side of the energy storage apparatus, the electrical device protrudes from the surface of the energy storage device and the electrode terminal and the outer electrode protrude from the surface of the energy storage device on opposite sides of the electrical device.

* * * * *